(12) United States Patent
Ashizawa et al.

(10) Patent No.: US 8,513,857 B2
(45) Date of Patent: Aug. 20, 2013

(54) VIBRATIONAL WAVE MOTOR, LENS BARREL AND CAMERA

(75) Inventors: Takatoshi Ashizawa, Yokohama (JP); Toshikazu Morioke, Saitama (JP)

(73) Assignee: Nikon Corporation, Tokyo (JP)

( * ) Notice: Subject to any disclaimer, the term of this patent is extended or adjusted under 35 U.S.C. 154(b) by 302 days.

(21) Appl. No.: 13/016,312

(22) Filed: Jan. 28, 2011

(65) Prior Publication Data

US 2011/0280559 A1    Nov. 17, 2011

(30) Foreign Application Priority Data

Feb. 8, 2010 (JP) .................................. 2010-025161
Feb. 8, 2010 (JP) .................................. 2010-025757

(51) Int. Cl.
*H02N 2/16* (2006.01)
(52) U.S. Cl.
CPC .................................... *H02N 2/163* (2013.01)
USPC ............................................................ 310/323.03
(58) Field of Classification Search
CPC ........... H02N 2/103; H02N 2/12; H02N 2/16; H02N 2/163; H02N 2/166
USPC ........................ 310/316.02, 323.01–323.21
See application file for complete search history.

(56) References Cited

U.S. PATENT DOCUMENTS

| 4,562,374 | A | 12/1985 | Sashida |
| 7,705,518 | B2 | 4/2010 | Kurosawa |
| 7,956,513 | B2 | 6/2011 | Tanaka et al. |

FOREIGN PATENT DOCUMENTS

| JP | A-61-35178 | 2/1986 |
| JP | A-63-174581 | 7/1988 |
| JP | B2-1-17354 | 3/1989 |
| JP | A-2003-259667 | 9/2003 |
| JP | A-2008-92748 | 4/2008 |
| JP | A-2008-289350 | 11/2008 |
| JP | A-2009-240043 | 10/2009 |

OTHER PUBLICATIONS

Jan. 10, 2012 Office Action issued in Japanese Patent Application No. 2010-025161 (with translation).

*Primary Examiner* — Derek Rosenau
(74) *Attorney, Agent, or Firm* — Oliff & Berridge, PLC

(57) ABSTRACT

A vibrational wave motor which can realize a suitable drive performance and can be driven quietly. The vibrational wave motor includes: an electromechanical-conversion element excited by a driving signal; a vibrating element joined with the electromechanical-conversion element, and having a drive surface where a progressive vibrational wave is generated by the excitation; a relative motion member having a sliding surface pressure-contacting the drive surface of the vibrating element, and which is driven by the wave; and a driving device for providing the driving signal to the electromechanical-conversion element, wherein: the driving device provides the driving signal to the electromechanical-conversion element, the driving signal generating the wave satisfying a-value/$\lambda \leq 0.00025$ in the drive surface, where a vibration amplitude generated in the drive surface of the vibrating element is a-value, and a wavelength generated in the drive surface of the vibrating element is $\lambda$.

18 Claims, 7 Drawing Sheets

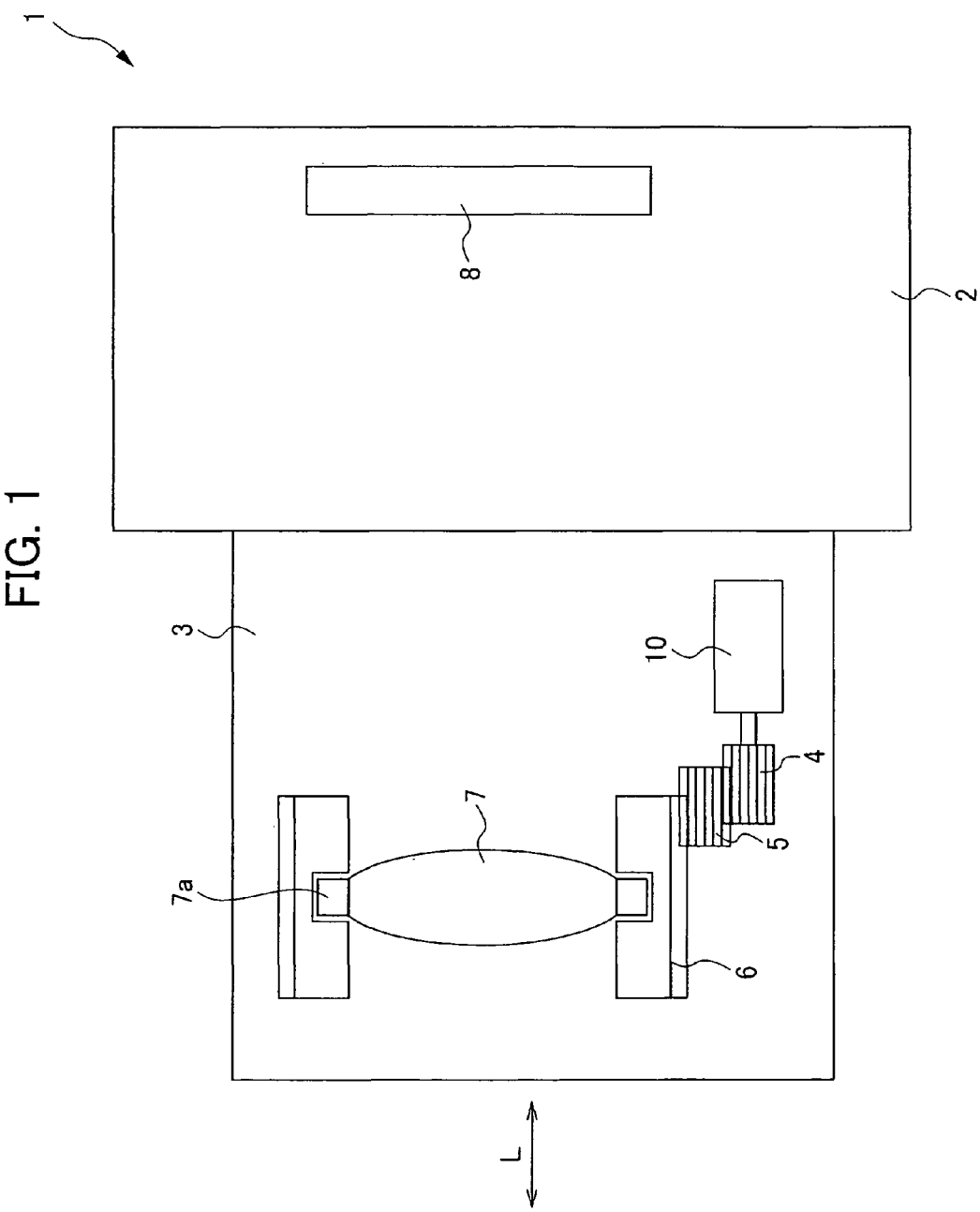

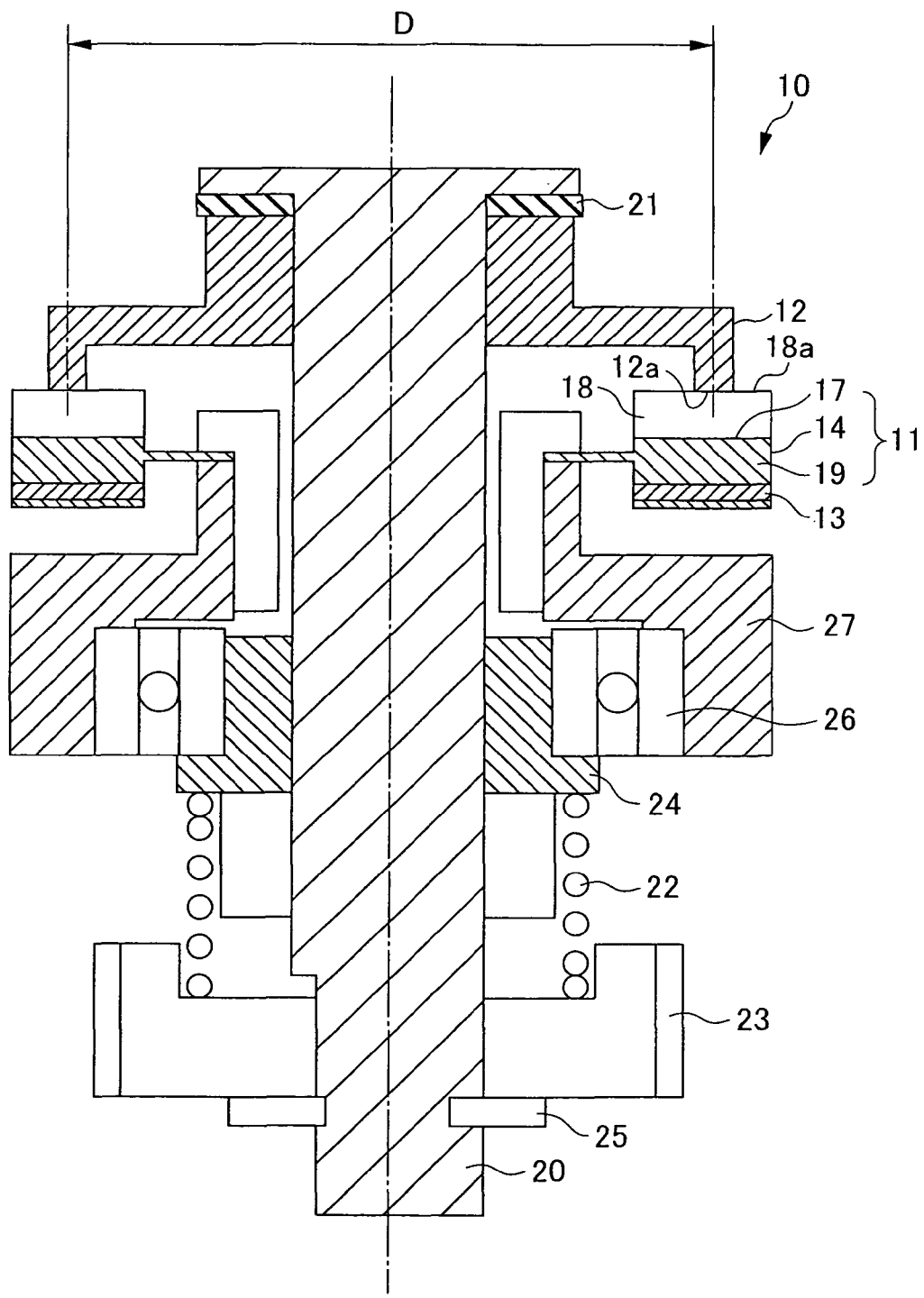

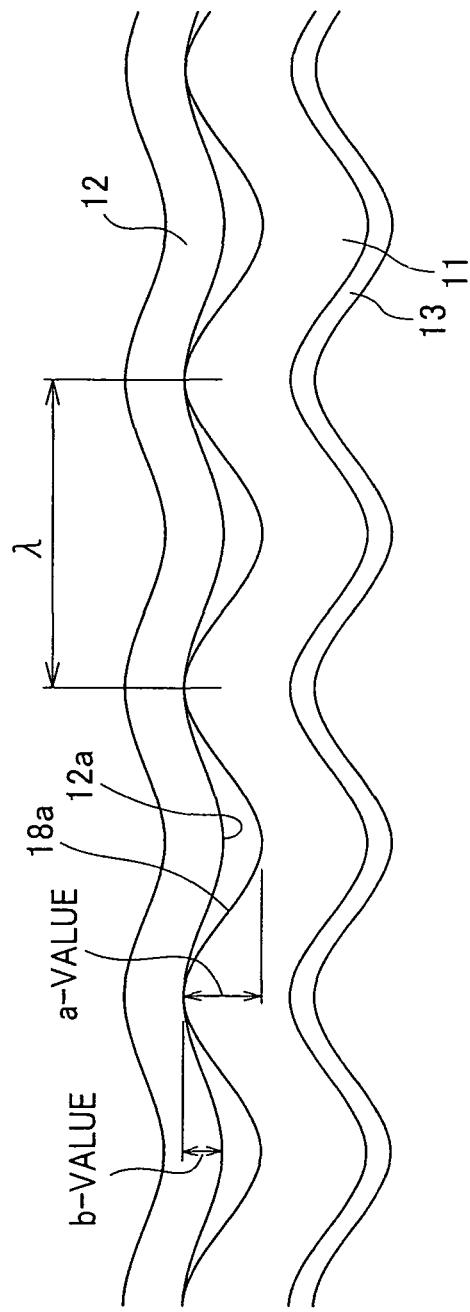

VIBRATIONAL WAVE MOTOR, LENS BARREL AND CAMERA

The present application claims priority under 35 U.S.C. §119 to Japanese Patent Applications No. 2010-025757 and No. 2010-025161 filed on Feb. 8, 2010. The content of the application is incorporated herein by reference in its entirety.

BACKGROUND OF THE INVENTION

1. Field of the Invention

The present invention relates to a vibrational wave motor, a lens barrel and a camera.

2. Description of the Related Art

The vibrational wave motor is intended to generate a progressive vibrational wave (hereinafter, abbreviated to "progressive wave") on a drive surface of an elastic body using expansion and contraction of a piezoelectric body, as publicly known from Japanese Examined Patent Application, Publication No. H1-17354, and so on. By this progressive wave, elliptic motion occurs on the drive surface, and a moving element in pressure-contact with a crest of a wave of the elliptic motion is driven. Such a vibrational wave motor is characterized in that it has a high torque even when the revolution rate is low. For this reason, the motor has the advantage that it is possible to omit the gears of a driving device in the case of the motor being mounted on the driving device, and to achieve silent operation with the gear's noises being eliminated as well as to improve the positioning accuracy.

On the other hand, the characteristics are unstable for this vibrational wave motor since it uses a vibration amplitude of about 1 μm generated at the stator. For the purpose of solving this problem, Japanese Unexamined Patent Application, Publication No. S61-35178 discloses making the amplitude at least 1.5 times the surface roughness of the drive surface to improve the drive efficiency and drive performance.

SUMMARY OF THE INVENTION

According to a technique described in Japanese Unexamined Patent Application, Publication No. S61-35178, in the case of a certain magnitude of the amplitude, a suitable drive performance is obtained, and silent driving is achieved. However, if the vibration amplitude is too high, the problems arise that the pressurization is not effective for the moving element, abnormal noises occur, or appropriate friction contact cannot be made between the moving element and the vibrating element, so that satisfactory drive performance cannot be offered.

In recent years, the abrasion resistance of materials of the drive surface has advanced and frictional wear has been reduced in the case where the vibrating element is made to generate a large vibration amplitude for the driving, so that it has become possible to generate a large amplitude at the vibrating element. Accordingly, there has been raised a new problem for optimizing a velocity control at the time of large-amplitude driving.

In addition, in a constitution such as in Japanese Examined Patent Application, Publication No. H1-17354, for a constitution in which a vibrating element and a moving element are in frictional communication, the efficiency and drive properties of the motor are influenced by the state of contact between the vibrating element and the moving element.

For example, if the moving element has a low stiffness and a too large deformation amount, then the moving element is deformed too much by complying with the amplitude of the vibrating element, and is influenced by the nodes of the progressive wave (negative velocity portions) and the drive properties and efficiency at the time of low velocity rotation deteriorate.

On the contrary, if the moving element has a high stiffness and a too small deformation amount, then the contact state becomes unstable when the amplitude of the vibrating element becomes large, which becomes a source for generating abnormal noise.

Conventionally, driving has been performed in a regime in which the amplitude is relatively small because of insufficient abrasion resistance of the sliding material, so that the above-mentioned problem has not been particularly evident; however, in recent years, the abrasion resistance of materials for the drive surface has advanced, and the amount of frictional wear has been reduced in the case where the vibrating element is driven so as to generate a large vibration amplitude for the driving, so that the above-mentioned problem is becoming evident.

It is an object of the present invention to solve this problem, and to provide a vibrational wave motor, a lens barrel and a camera, which can realize a suitable drive performance and can be driven quietly.

The present invention solves the above-mentioned problem by the means as described hereinafter.

According to the first aspect of the present invention, a vibrational wave motor is provided comprising: an electromechanical conversion element excited by a driving signal; a vibrating element joined with the electromechanical conversion element, and having a drive surface where a progressive vibrational wave is generated by the excitation; a relative motion member having a sliding surface pressure-contacting the drive surface of the vibrating element, and which is driven by the progressive vibrational wave; and a driving device for providing the driving signal to the electromechanical conversion element, wherein: the driving device provides the driving signal to the electromechanical conversion element, the driving signal generating the progressive vibrational wave satisfying a-value/$\lambda \leq 0.00025$ in the drive surface, where a vibration amplitude generated in the drive surface of the vibrating element is defined as the a-value, and a wavelength of the progressive wave generated in the drive surface of the vibrating element is defined as $\lambda$.

According to the second aspect of the present invention, a vibrational wave motor is provided comprising: an electromechanical conversion element excited by a driving signal; a vibrating element joined with the electromechanical conversion element, and having a drive surface where a progressive vibrational wave is generated by the excitation; a relative motion member having a sliding surface pressure-contacting the drive surface of the vibrating element, and which is driven by the progressive vibrational wave; and a driving device for providing the driving signal to the electromechanical conversion element, wherein: the driving device provides the driving signal to the electromechanical conversion element, the driving signal generating the progressive vibrational wave satisfying a-value/b-value$\leq 3$ in the drive surface, where a vibration amplitude generated in the drive surface of the vibrating element is defined as the a-value, and the deformation amount in a pressurization direction of the sliding surface of the relative motion member pressure-contacting the drive surface of the vibrating element is defined as the b-value.

The driving device may provide to the electromechanical conversion element the driving signal for generating the progressive vibrational wave satisfying a-value/b-value$\leq 3$ at the drive surface, where the vibration amplitude caused at the drive surface of the vibrating element is defined as the a-value, a deformation amount of the sliding surface of the relative motion member pressurized and brought into contact with the drive surface of the vibrating element in a pressurization direction is defined as the b-value.

The driving device provides to the electromechanical conversion element the driving signal for generating the progressive vibrational wave satisfying 0.000003≦a-value/λ in the drive surface.

The driving device provides to the electromechanical conversion element the driving signal for generating the progressive vibrational wave satisfying 0.04≦a-value/b-value in the drive surface.

A durable thin film may be applied to the drive surface of the elastic body or the sliding surface of the relative motion member.

The thin film may have polyamide-imide as a main component, and has a Young's modulus of 4 GPa or higher and 10 Gp or less, and a film thickness of 50 μm or less.

According to the third aspect of the present invention, a vibrational wave motor is provided comprising: a vibrating element generating a progressive vibrational wave in a drive surface by excitation of an electromechanical conversion element; a relative motion member having a sliding surface pressure-contacting the drive surface of the vibrating element, and being driven by the progressive vibrational wave, wherein: 0.009≦b/λ≦0.03 [%] is held when a deformation amount in a pressurization direction of the sliding surface of the relative motion member which pressure-contacts the drive surface of the vibrating element is defined as b, and a wavelength of the progressive wave generated at the drive surface of the vibrating element is defined as λ.

A durable thin film may be applied on the drive surface of the vibrating element or the sliding surface of the relative motion member.

The durable thin film may have polyamide-imide as a main component, and a Young's modulus of 4 GPa or higher and a film thickness of 50 μm or less.

The wavelength may be 4 to 15 mm.

A sliding central diameter may be 5 mm to 40 mm.

A height H of the sliding portion of the relative motion member may be 0.7 [mm]≦H≦1.2 [mm].

If N may be a pressurization force with which the vibrating element and the relative motion member are pressure-contacted and D is a sliding diameter of the relative motion member, then N/D=p has a range of 0.2 [N/mm]≦p≦0.9 [N/mm].

According to the fifth aspect of the present invention, a lens barrel is provided in which the vibrational wave motor described above is provided.

According to the sixth aspect of the present invention, a camera is provided in which the vibrational wave motor described above is provided.

It should be noted that the above-mentioned constitution may be modified as appropriate, and at least a part of the constitution may be substituted by another constituent.

According to the present invention, it is possible to provide a vibrational wave motor, a lens barrel and a camera, which can realize a suitable drive performance and can be driven quietly.

BRIEF DESCRIPTION OF THE DRAWINGS

FIG. 1 is a figure for explaining a camera provided with a vibrational wave motor;

FIG. 2 is a figure for explaining a vibrational wave motor;

FIG. 3 is a figure for explaining a contact state between a vibration element and a moving element in a vibrational wave motor using a progressive wave;

Figure 4A:
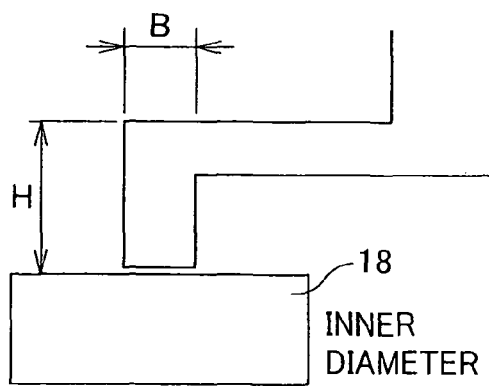
FIG. 4 is a figure for explaining a contact state between a vibration element and a moving element in a vibrational wave motor using a progressive wave.

DETAILED DESCRIPTION OF THE PREFERRED EMBODIMENTS (First Embodiment)

Below, an embodiment of a vibrational wave motor 10 according to the present invention is described in detail referring to the attached drawings.

FIG. 1 is a figure for explaining a camera 1 having a vibrational wave motor 10 of the first embodiment.

The camera 1 is provided with a camera body 2 having an image pickup device 8, and a lens barrel 3 having a lens 7. The lens barrel 3 is an interchangeable lens that can be attached to and detached from the camera body 2. It should be noted that in the present embodiment, an example in which the lens barrel 3 is an interchangeable lens is shown, but this is not a limitation, and for example, the lens barrel 3 may be a lens barrel integrated with the camera body.

The lens barrel 3 is provided with a lens 7, a cam tube 6, gears 4, 5, a vibrational wave motor 10 and so on. In the present embodiment, a driving force obtained from the vibrational wave motor 10 is transferred to the cam tube 6 via the gears 4, 5. The lens 7 is held in the cam tube 6 via a lens frame 7a, and is moved substantially in parallel with the optical axis direction (direction of the arrow L shown in FIG. 1) by a driving force of the vibrational wave motor 10.

In FIG. 1, a subject image is imaged on an image pickup surface of the image pickup device 8 by a lens unit (including the lens 7), not shown, which is provided within the lens barrel 3. By the image pickup device 8, the imaged subject image is converted into an electrical signal, and the signal is A-D converted to produce image data.

FIG. 2 is a figure for explaining the vibrational wave motor 10 of a first embodiment of the present invention.

In the present embodiment, a side of the vibrating element 11 is fixed and a relative motion member (moving element) 12 is driven.

The vibrating element 11 is composed of an electromechanical conversion element (hereinafter, called a piezoelectric body 13) such as a piezoelectric element or electrostrictive element converting electric energy into mechanical energy as described later, and an elastic body 14 joined to the piezoelectric body 13. Progressive waves are generated in the vibrating element 11, in the present embodiment, one example in which 4-wave progressive waves are used is described.

An elastic body 14 consists of a metal material having a high resonance sharpness, and its shape is annular.

A groove 17 is formed on an opposite surface to that joined to the piezoelectric body 13, and a tip surface of a protruding part 18 (location in which there is no groove 17) serves as a drive surface 18a to be pressure-contacted with the moving element 12.

The reason why the groove 17 is formed is that the neutral plane of a progressive wave should be as close to the side of the piezoelectric body 13 as possible, thereby to amplify the amplitude of the progressive wave on the drive surface 18a. A portion in which the groove 17 is not formed is called a base portion 19 in the present embodiment. The piezoelectric body 13 is in contact with a surface of the base portion 19, opposed to a side of the groove 17.

The drive surface 18a of the elastic body 14 is subjected to a lubricative surface treatment for the purpose of securing abrasion resistance at the time of high-speed driving. The material uses polyamide-imide as a main component, to which PTFE is added, and as its material property, the Young's modulus is about 4-10 GPa, preferably no more than 8 GPa. In addition, the thickness is set to 5 μm to 50 μm.

The piezoelectric body 13 is generally composed of a material of lead zirconate titanate known as "PZT", but in recent years, is sometimes composed of potassium sodium niobate, potassium niobate, sodium niobate, barium titanate, bismuth sodium titanate, bismuth potassium titanate, and so on, which are lead-free materials, in view of environmental concern.

Electrodes (not shown) are disposed on a surface of the piezoelectric body 13, and are separated into two phases (A-phase, B-phase) along a circumferential direction. In each phase, polarization is made alternately for each half of the wavelength, and the electrodes are disposed so that a ¼ wavelength space is open between the A-phase and B-phase.

The moving element 12 consists of a light metal such as aluminum, and the surface of the sliding surface 12a undergoes an alumite treatment for improving the abrasion resistance.

An output axis 20 is coupled with the moving element 12 via a rubber member 21, so as to rotate integrally with the moving element 12. The rubber member 21 between the output axis 20 and the moving element 12 is required to have a function of coupling the moving element 12 with the output axis 20 by the adherence of the rubber, and a function of vibrational absorption so that vibrations from the moving element 12 are not transferred to the output axis 20, for which butyl rubber or the like is suitable.

A pressurizing member 22 is provided between a gear member 23 fixed on the output axis 20 and a bearing reception member 24. The gear member 23 is inserted in a D-cut of the axis to be fitted in the cut, and is fixed by a stopper 25 such as an E-clip and made to be integral with the output axis 20 in the rotational direction and the axial direction. The bearing reception member 24 is inserted in the inner diameter side of the bearing 26, and the bearing 26 is structured to be inserted in the inner diameter side of a fixture member 27.

By such a structure, the moving element 12 is pressure-contacted with a drive surface 18a of the moving element 11.

FIGS. 3 and 4 are figures for explaining the contact state of the vibrational element 11 and moving element 12 of the vibrational wave motor 10 using a progressive wave.

In a vibrational piece 11, a progressive wave is generated, and its amplitude is set as the a-value (p-p) and the wavelength of the wave is λ [mm]. The magnitude of elliptic motion caused in the crest of a progressive wave in the pressurization direction and the magnitude of the same in the circumferential direction are substantially 1:1, and therefore the magnitude of the a-value is approximated in the following formula.

$$a = \text{no-load rotational velocity[rpm]}/60 \times \pi \times D \times 2\pi \times f \times 2$$

Herein,

D: diameter [mm] of the sliding surface 12a of the moving element 12 f: frequency [Hz] of the driving signal

It should be noted that D is defined as the median between the outer diameter and the inner diameter because the sliding surface 12a has a width.

On the other hand, the moving element 12 is pressure-contacted with the drive surface 18a of the vibrational element 11, so that the sliding surface 12a is deformed along the progressive wave. Its deformation amount is set as the b-value. The magnitude of the b-value is approximated by the below-mentioned formula.

$$b = 1/384 \times p \times \lambda^4 \div (E \times (B \times H^3/12))$$

Herein, p: load[N]÷(D×n), load per unit length [N/mm]

E: Young's modulus [N/mm²] of a sliding section of the moving element 12

B: the width [mm] of a sliding section of the moving element 12

H: the height [mm] of a sliding section of the moving element 12

The a-value, b-value and λ were thought to be non-related so far, but as a result of an experiment, it has been found that there is a suitable range.

The result of the experiment is shown in Table 1.

TABLE 1

| SLIDING DIAMETER | D (mm) | | 10.6 | | | |
| WAVE NUMBER | n | | 4 | | | |
| WAVELENGTH | λ (mm) | | 8.33 | b-VALUE [MM] | | 0.000755 |

| DRIVE FREQUENCY f (Hz) | ROTATIONAL VELOCITY (rpm) | AMPLITUDE OF A CREST OF A PROGRESSIVE WAVE (p-p) [a-VALUE] (mm) | AMPLITUDE / WAVELENGTH [a-VALUE ÷ λ] | DRIVE EFFICIENCY | AMPLITUDE / b-VALUE [a-VALUE ÷ b-VALUE] | AB-NORMAL NOISE |
| --- | --- | --- | --- | --- | --- | --- |
| 64000 | 145 | 0.0004 | 0.00005 | 9.1% | 0.5 | ○ |
| 62000 | 277 | 0.0008 | 0.00009 | 15.5% | 1.0 | ○ |
| 60500 | 501 | 0.0015 | 0.00018 | 22.9% | 1.9 | ○ |
| 60000 | 600 | 0.0018 | 0.00021 | 25.1% | 2.3 | ○ |
| 59500 | 710 | 0.0021 | 0.00025 | 27.4% | 2.8 | ○ |
| 59300 | 750 | 0.0022 | 0.00027 | 26.2% | 3.0 | ○ |
| 59000 | 850 | 0.0025 | 0.00031 | 25.1% | 3.4 | x | a = ROTATIONAL VELOCITY/60 × π × D × 2π × f × 2

$$b = \frac{1}{384} \cdot P\lambda^4 \cdot \frac{1}{E \cdot \left(\frac{BH^3}{12}\right)}$$

E = YOUNG'S MODULUS [N/mm²]
p = PRESSURIZATION FORCE [N]/πD
○: THERE IS NO ABNORMAL NOISE
x : THERE IS A REMARKABLE ABNORMAL NOISE

As the drive frequency of the driving signal is changed to vary the rotational velocity, the drive efficiency gradually increases, but starts to reduce at a certain value. It is thought that the reason is that there is conversion loss from the vibration energy of the vibrating element 11 to the rotational motion energy of the moving element 12 when the amplitude is small, but the conversion loss becomes reduced when the amplitude becomes larger; however, the amplitude becomes too large at a certain vibration amplitude value or higher to cause a loss in the vibration itself. It is thought that a threshold value therefor is determined by the proportion of the amplitude to the wavelength (that is, a-value/λ).

The state in which a loss is caused in the vibration itself is a state in which the vibration is unstable, and so in this unstable range the vibrational wave motor 10 is hard to control.

According to the present measurement, the drive efficiency is reduced when a-value/λ is greater than $\leq 0.00025$. Therefore, a relation of a-value/$\lambda \leq 0.00025$ is suitable.

In addition, in order to realize stable rotation, a relation of $0.000003 \leq$ a-value/λ is suitable.

It is noted that the drive efficiency is calculated by drive efficiency=rotational velocity×torque÷input power.

In addition, as the drive frequency of the drive signal is changed to vary the rotational velocity, an abnormal noise starts to occur over a certain number of revolutions. It is thought that the reason is that when the amplitude is small, the drive surface 18a of the vibrating element 11 is in close contact with the sliding surface 12a of the moving element 12, but the holding by the pressure becomes ineffective as the amplitude becomes larger and the rotational velocity is increased, and the sliding surface 12a of the moving element 12 starts to float to cause a gap with respect to the drive surface 18a of the vibrating element 11.

The threshold value is supposedly determined by the proportion of the amplitude to the deformation amount of the sliding surface 12a of the moving element 12 (that is, a-value/b-value). A state in which the abnormal noise occurs corresponds to a state in which, because the rotational velocity is unstable, it becomes difficult to control the vibrational wave motor 10 in this unstable range.

According to the present measurement, a relation of a-value/b-value$\leq 3.0$ is suitable. In addition, in order to realize stable rotation, a relation of $0.04 \leq$ a-value/b-value is suitable.

It should be noted that definitions of a B-value and an H-value correspond to the width and height of the sliding portion of the moving element 12 as shown in FIG. 4A.

Figure 4B:
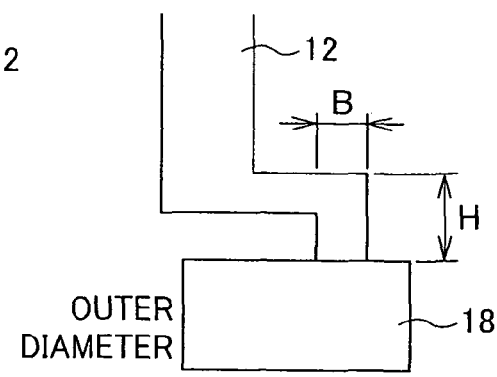

FIG. 4A shows a supporting member of the sliding section extending to an inner diameter side, but it leads to the same definition even if it extends to an outer diameter as shown in FIG. 4B.

Figure 4C:
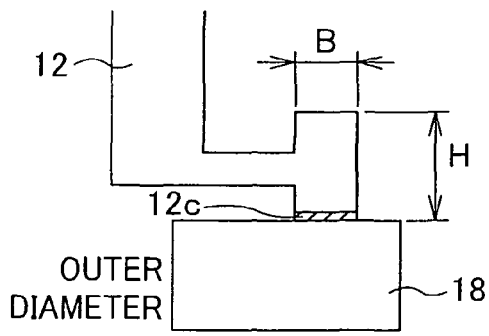

In addition, as shown in FIG. 4C, in the case where a sliding material 12c made of a polymeric substance is adhered to the sliding surface 12a, the sliding material has a Young's modulus much lower than metals, and for this reason, the definition applies to parts with the exception of the part of the sliding material 12c.

Figure 5:
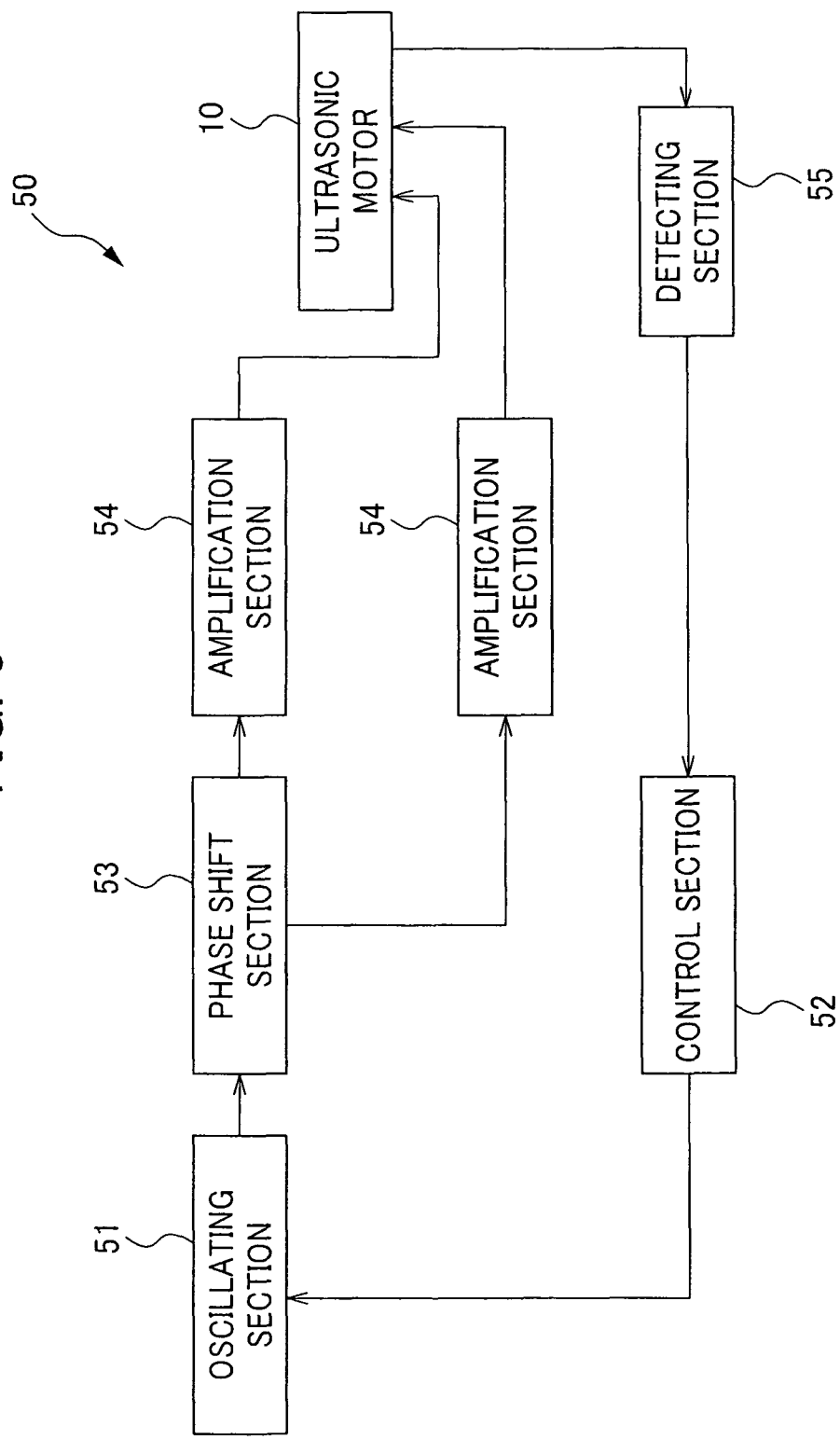
FIG. 5 is a block diagram for explaining a driving device for a vibrational wave motor.

FIG. 5 is a block diagram for explaining a driving device 50 of the vibrational wave motor 10 of the first embodiment.

First, the drive/control of the vibrational wave motor 10 is described.

An oscillating section 51 generates a driving signal of a desired frequency according to an instruction of the control section 52.

A phase shift section 53 divides the driving signal generated by the oscillating section 51 into two driving signals different in phase.

Amplification sections 54 boost the two driving signals divided by the phase shift section 53 to their respectively desired voltages.

The driving signals from the amplification sections 54 are transferred to the vibrational wave motor 10, and a progressive wave is generated at the vibrating element 11 by application of the driving signals, and the moving element 12 is driven.

A rotation detecting section 55 is constituted of an optical encoder, a magnetic encoder or the like, and detects a position and a velocity for a driven entity driven by the driving of the moving element 12, and transfers the detected value as an electrical signal to the control section 52. The control section 52 controls driving of the vibrational wave motor 10 based on a driving instruction from a CPU within the lens barrel 3 or in a main body of the camera 1.

The control section 52 receives the detection signal from the rotation detecting section 55, and based on its value, obtains the positional information and velocity information to control the frequency of the oscillating section 51 and voltages of the amplification sections 54 in such a manner that positioning in a target location is realized.

With respect to the driving in a forward direction and the driving in a reverse direction, in the case of driving in the driving forward direction, the phase difference between the two driving signals (frequency voltage signals) in the phase shift section 53 may be set to a positive (+) value, for example, +90 degrees, whereas in the case of driving in the reverse direction, the phase difference between the two driving signals (frequency voltage signals) in the phase shift section 53 may be set to a negative (−) value, for example, −90 degrees.

Figure 6:
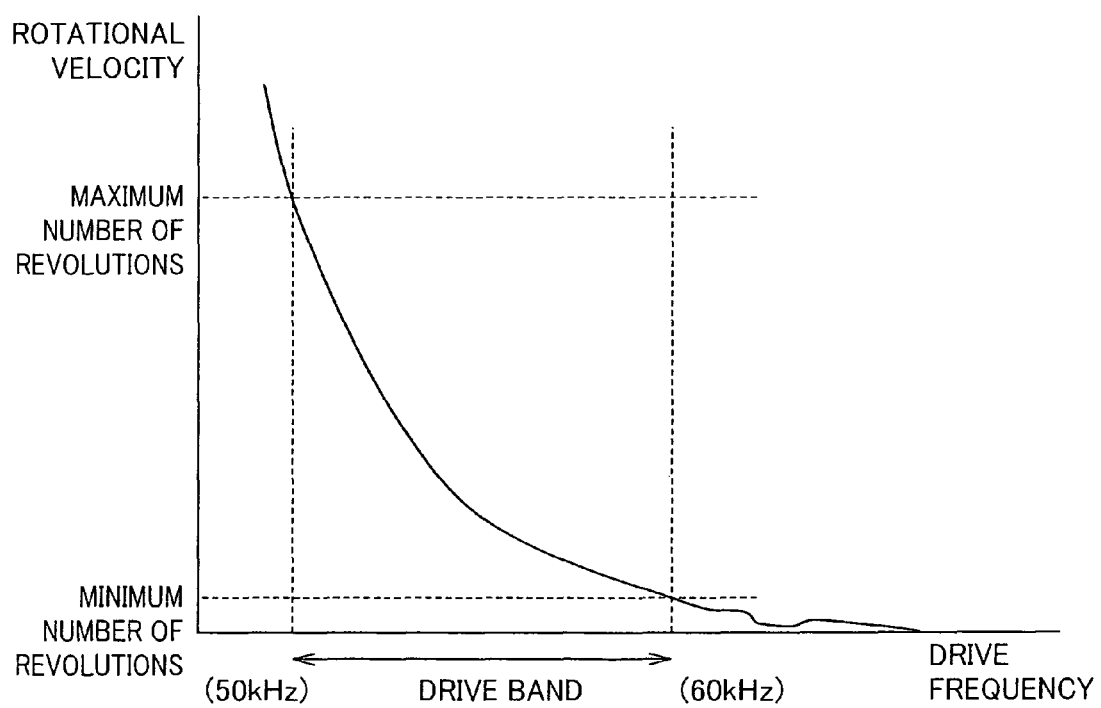
FIG. 6 is a figure for explaining a relation between the frequency and the velocity of the vibrational wave motor.

FIG. 6 is a figure for explaining the relation between the frequency and velocity of the vibrational wave motor 10.

In the case of the vibrational wave motor 10, it is common that velocity change and control are carried out at a drive frequency, and the velocity is increased as the frequency is reduced and the velocity is reduced as the frequency is increased.

According to the present embodiment, the driving device 50 of the vibrational wave motor 10 is operated as follows.

Firstly, setting within a factory before shipment is explained.

First, D, the diameter [mm] (see FIG. 2) of the sliding surface 12a of the moving element 12 and , the wavelength [mm] of the vibrating element 11 are input to the control section 52.

Next, preliminary driving is carried out.

For the method, first, a driving signal is generated from the oscillating section 51. The signal is divided into two driving signals that are different in phase by 90 degrees by the phase section, and are amplified to desired voltages by the amplification section 54.

The driving signal is applied to the piezoelectric body 13 of the vibrational wave motor 10 to generate a progressive wave at the drive surface 18a of the vibrating element 11.

A moving element 12 pressure-contacted with the drive surface 18a, is frictionally driven by the elliptic motion.

An optical encoder is disposed at a driven body driven by the driving of the moving element 12, and from it an electrical pulse is generated and transferred to the control section 52, and the velocity can be obtained.

The drive frequency for holding a relation of a-value/$\lambda \leq 0.00025$ is obtained from the amplitude a-value of a progressive wave calculated from 1) the velocity value, 2) the drive frequency at the time, 3) the inputted D-value, and from 4) the inputted value of λ.

Its frequency is set to a lower limit frequency A. Up to here are the settings within a factory before shipment.

As the actual operation of driving and control, a drive instruction is issued from the control section 52, and the drive signal is generated from the oscillating section 51. The signal is divided into two driving signals different in phase by 90 degrees by the phase shift section, and amplified to desired voltages by the amplification sections 54.

The driving signals are applied to the piezoelectric body 13 of the vibrational wave motor 10, and the piezoelectric body 13 is excited, and this excitation leads to generation of fourth-order bending vibration in the elastic body 14.

The piezoelectric body 13 is divided into an A-phase and a B-phase, and the driving signals are applied to the A-phase and the B-phase, respectively. The fourth order bending vibration generated from the A-phase and the fourth order bending vibration generated from the B-phase are shifted from each other in positional phase by ¼ wavelength, and in addition, the A-phase driving signal and the B-phase driving signal have a 90-degree phase shift, and so the two bending vibration components are combined to form a 4-wave progressive wave.

Elliptic motion is caused at the wave crest of the progressive wave. Therefore, the moving element 12 pressure-contacting the drive surface 18*a* is frictionally driven by this elliptic motion. An optical encoder is disposed in a driven body driven by the driving of the moving element 12, and therefrom an electrical pulse is generated and transferred to the control section 52. The control section 52 can obtain the current position and the current velocity on the basis of the signal. The control section 52 performs control by changing the frequency to match the target velocity and the actual velocity, but the frequency is kept from going below the lower limit frequency A.

By executing such a control method, a suitable drive efficiency is always achieved to enable silent driving.

In the present embodiment, a drive surface 18*a* of the elastic body 14 is subjected to a lubricant surface treatment.

Its material has polyamide as a main component and is a substance to which PTFE is added, and its physical properties are a Young's modulus of 4 GPa or higher and a thickness of 50 μm or less.

If the lubricant material for the surface has a Young's modulus less than this and a thickness greater than this, inroads deformation arises at the location of the drive surface 18*a* contacting the sliding surface 12*a* of the moving element 12, resulting in complicated frictional driving, and there may be a relation between the vibration amplitude and the driving efficiency that is different from that the inventor has found. In the case where the lubricant surface treatment for the drive surface 18*a* has a Young's modulus of 4 GPa or higher and a thickness of 50 μm or less, the relation between the vibration amplitude and the driving efficiency the inventor has found is realized, and therefore the effects of the present invention are achieved.

It is noted that an upper limit of the Young's modulus is 10 GPa or less in respect of manufacture. In addition, a lower limit of a film thickness is preferably 5 μm or larger because the film becomes easy to peal as the film thickness is smaller.

For example, in a conventional drive surface 18*a* of the moving element 11 forming a thin lubricant film having a large Young's modulus and made of a metal material or metal plating, combined with a sliding surface 12*a* of the moving element 12 made of a metal material or metal plating, frictional wear becomes intensive as the drive velocity is high because of frictional driving of metal materials with each other, so that the a-value cannot be large (the vibration amplitude cannot be larger).

For this reason, the driving cannot reach the control region defined in the present embodiment, and there is no need for the numerical values as in the present embodiment. However, if a thin lubricant film having a large Young's modulus is formed on the drive surface 18*a* or the sliding surface 12*a*, then frictional wear does not occur even if the vibration amplitude is set higher to increase the drive velocity. For this reason, the control method of the present embodiment is effective.

However, even in the conventional combination of the drive surface 18*a* of the vibrating element 11 being of a metal material or metal plating and the sliding surface 12*a* of the moving element 12 being of a metal material or metal plating, the method of the present embodiment is effective and its effects are exerted as long as frictional wear does not arise at the time of high-velocity driving.

(Second Embodiment)

Next, the second embodiment is described. The vibration amplitude is controlled based on the deformation amount in a pressurized state of the moving element 12.

In the present embodiment, a vibrational wave motor control device is operated as follows. First, the setting within a factory before shipment is explained.

At first, D [mm] (the diameter of the sliding surface 12*a* of the moving element 12), λ [mm] (the wavelength of the moving element 11) and the b-value [mm] (the deformation amount of the moving element 12 in a pressurized state) are calculated and inputted to the control section 52.

Next, preliminary driving is carried out. For a method therefor, a driving signal is generated from the oscillating section 51, and the signal is divided into two driving signals different in phase by 90 degrees by the phase shift section and are amplified to the desired voltages by the amplification sections 54. The driving signals are applied to the piezoelectric body 13 of the vibrational wave motor 10 to cause the drive surface 18*a* of the vibrating element 11 to generate a progressive wave. The moving element 12 which pressure-contacts the drive surface 18*a* is frictionally driven by this elliptic motion. An optical encoder is disposed at the driven body 30 driven by the driving of the moving element 12, from which an electrical pulse is generated and transferred to the control section 52, making it possible to obtain the velocity.

Likewise, the frequency at which a relation of a-value/b-value≦3.0 is held is obtained from the a-value of the amplitude of the progressive wave calculated from 1) the velocity value, 2) the drive frequency at that time and 3) the inputted D-value, and from 4) the inputted b-value. This frequency is set to be the lower limit frequency B. It is noted that 0.04≦a-value/b-value for achieving stable rotation. The aforementioned are settings within the factory before shipment.

As the actual operation of driving and control, a drive instruction is issued from the control section 52, a driving signal is generated from the oscillating section 51, and the signal is divided into two driving signals different in phase by 90 degrees by the phase shift section, and amplified to the desired voltages by the amplification sections 54. The driving signals are applied to the piezoelectric body 13 of the vibrational wave motor 10, and the piezoelectric body 13 is excited, and this excitation leads to generation of fourth-order bending vibration in the elastic body 14. The piezoelectric body 13 is separated into A-phase and B-phase, and the driving signals are applied to the A-phase and B-phase, respectively. The fourth order bending vibration generated from the A-phase and the fourth bending vibration generated from the B-phase are shifted from each other in positional phase by ¼ wavelength, and the A-phase driving signal and the B-phase driving signal are shifted from each other in phase by 90 degrees and so the two bending vibration components are combined to form a 4-wave progressive wave.

Elliptic motion is caused at the wave crest of the progressive wave. Therefore, the moving element 12 which pressure contacts the drive surface 18a is frictionally driven by this elliptic motion. An optical encoder is disposed at the drive body driven by the driving of the moving element 12, from which an electrical pulse is generated and transferred to the control section 52. The control section 52 can obtain the current position and the current velocity based on this signal. The control section 52 performs control by changing the frequency to match the target velocity and the actual velocity, but the frequency is prevented from going below the lower limit frequency B.

In the first embodiment, the control is made to hold the relation of a-value/λ≦0.00025, and in the second embodiment, the control is made to hold the relation of a-value/b-value≦3.0, but a method in which both of the relations are held may also be adopted.

(Third Embodiment)

Figure 7:
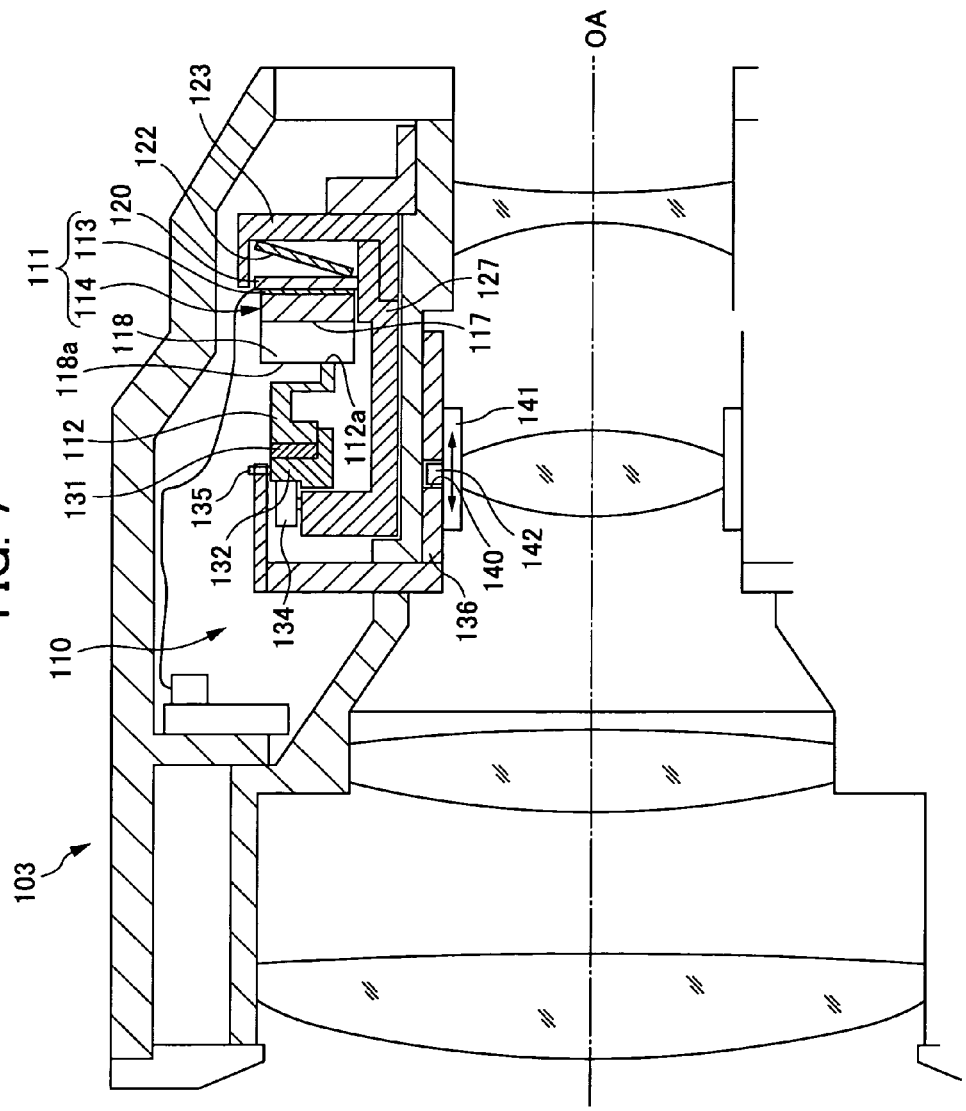
FIG. 7 is a figure for explaining a vibrational wave motor of the third embodiment of the present invention

FIG. 7 is a figure for explaining the vibrational wave motor 110 of the third embodiment of the present invention, and is a figure of the state in which a ring-shaped vibrational wave motor 110 is incorporated in a lens barrel 103.

A vibrating element 111 is composed of an electromechanical conversion element (hereinafter, called a piezoelectric body) 113 whose examples include a piezoelectric element, an electrostrictive element and so on for converting electrical energy to mechanical energy, and an elastic body 114 joined to the piezoelectric body 113. A progressive wave is generated in the vibrating element 111, and in the present embodiment, the progressive wave is explained for a 9-wave progressive wave as an example.

The elastic body 114 consists of a metal material having a high resonant sharpness, and its shape is annular. A groove 117 is formed on an surface opposite to that joined to the piezoelectric body 113, and a tip surface of a protruding part 118 (location in which there is no groove 117) serves as a drive surface 118a to be pressure-contacted with the moving element 112.

The reason why the groove 117 is formed is that the neutral plane of a progressive wave should be as close to the side of the piezoelectric body 113 as possible, thereby to amplify the amplitude of the progressive wave on the drive surface 118a.

The piezoelectric body 113 is divided into two phases (A-phase, B-phase) along a circumferential direction, and in each phase, elements whose polarization alternates for each half of the wavelength are arranged, with a space of ¼ wavelength being formed between the A-phase and the B-phase.

Under the piezoelectric body 113, there are disposed an non-woven fabric (not shown), a pressurizing plate 120 and a pressurizing member 122. The non-woven fabric is of felt, for example, and disposed under the piezoelectric body 113 so that vibration of the vibrating element 111 is not transferred to the pressurizing plate 120 and the pressurizing section. The pressurizing plate 120 is arranged to receive the pressure of the pressurizing member 122.

The pressurizing member 122 is disposed under the pressurizing plate 120, and generates a pressurizing force.

In the present embodiment, a disc spring is used for the pressurizing member 122, but instead of the disc spring, a coil spring or a wave spring may be used.

The pressurizing member 122 is fixed to the securing member 127 with a bracing ring.

The moving element 112 consists of a light metal such as aluminum, and the surface of the sliding surface 12a is provided with a sliding material for improving abrasion resistance.

On the moving element 112, a rubber-like vibration absorbing member 131 is disposed in order to absorb vibration in the longitudinal direction of the moving element 112, and above it, an output transfer section 132 is disposed.

The output transfer section 132 restricts the pressurization direction and the radial direction by a bearing 134 provided at the securing member 127, thereby restricting the pressurization direction and the radial direction of the moving element 112.

The output transfer section 132 has a projection portion 135, and therefrom is fitted with a fork interfit with a cam ring 136, so that the cam ring 136 is rotated with rotation of the output transfer section 132.

On the cam ring 136, a key groove 140 is formed obliquely with respect to the cam ring 136, and a securing pin 142 provided at an AF ring 141 is fitted in the key groove 140, so that rotational drive of the cam sing 136 causes the AF ring 141 to be driven in a direct advance direction in an optional axis direction and to be able to stop in a desired position.

The bracing ring 123 is attached to the securing member 127 by a screw, and by attaching this, it is possible to constitute a single motor unit from the output transfer section 132 to the moving element 112, vibrating element 111 and the spring.

Experimental results for the present embodiment are explained in Table 2.

TABLE 2

| SLIDING DIAMETER | D (mm) | 57.3 | | | |
|---|---|---|---|---|---|
| WAVE NUMBER | n | 9 | | | |
| WAVELENGTH | λ (mm) | 20.00 | b-VALUE [MM] | | 0.00155 |

| DRIVE FREQUENCY f (Hz) | ROTATIONAL VELOCITY (rpm) | AMPLITUDE OF A CREST OF A PROGRESSIVE WAVE (p-p) [a-VALUE] (mm) | AMPLITUDE/ WAVELENGTH [a-VALUE ÷ λ] | DRIVE EFFICIENCY | AMPLITUDE/ b-VALUE [a-VALUE ÷ b-VALUE] | ABNORMAL NOISE |
|---|---|---|---|---|---|---|
| 29000 | 12 | 0.0004 | 0.00002 | 7.2% | 0.3 | ○ |
| 28500 | 26 | 0.0009 | 0.00004 | 12.1% | 0.6 | ○ |
| 28000 | 70 | 0.0024 | 0.00012 | 24.4% | 1.5 | ○ |
| 27800 | 95 | 0.0033 | 0.00016 | 30.6% | 2.1 | ○ |
| 27750 | 108 | 0.0037 | 0.00019 | 33.5% | 2.4 | ○ |
| 27700 | 120 | 0.0041 | 0.00021 | 35.9% | 2.7 | ○ |
| 27650 | 135 | 0.0047 | 0.00023 | 34.9% | 3.0 | ○ |
| 27550 | 170 | 0.0059 | 0.00029 | 27.2% | 3.8 | x |

As the drive frequency of the driving signal is changed to vary the rotational velocity, the driving efficiency is increased gradually, but it starts to drop at a certain value. It is thought that this is because there is a conversion loss from the vibration energy of the vibrating element 111 to the rotational motion energy of the moving element 112 when the amplitude is small, and the conversion loss is reduced when the amplitude becomes larger, but a loss will occur in the vibration itself since the amplitude becomes too large at or above a certain vibration amplitude value. The threshold value for this is thought to be determined by the proportion (that is, a-value/λ) of the amplitude to the wavelength.

In the state where the loss occurs in the vibration itself, the vibration is unstable, and so in this unstable range, the vibrational wave motor 110 is in a state that is hard to control.

According to the present measurements, the relation of a-value/λ≦0.00025 is suitable. In addition, a relation of 0.000003≦a-value/λ is suitable in order to get stable rotation.

In addition, the driving efficiency is calculated from driving efficiency=rotational velocity×torque÷input power.

Furthermore, when trying to change the drive frequency of the driving signal and vary the rotational velocity, an abnormal noise starts to occur at a certain number of revolutions or higher. It is thought that this is because the drive surface 118a of the vibrating element 111 and the sliding surface 112a of the moving element 112 are closely attached to each other by pressurization when the amplitude is small, but as the amplitude becomes large and the rotational velocity is increased, holding by the pressurization becomes ineffective, and the sliding surface 112a of the moving element 112 begins to float and to create a gap between the surface 112a and the drive surface 118a of the vibrating element 111.

The threshold value for this is supposedly determined by the proportion (that is, a-value/b-value) of the amplitude to the deformation amount of the sliding surface 112a of the moving element 112. In a state where an abnormal noise is generated, the rotational velocity becomes unstable, and so in this unstable domain the vibrational wave motor 110 is in a hard to control state.

According to the present measurements, the relation of a-value/b-value≦3.0 is suitable. In addition, a relation of 0.04≦a-value/b-value is suitable in order to achieve stable rotation.

The driving method and control method in the present embodiment are the same as the first or second embodiment, and so their explanations are omitted.

For aforementioned reasons, as shown in Table 1 of the first embodiment and in Table 2 of the third embodiment, both in the first embodiment and in the third embodiment, a relation of a-value/λ≦0.00025 is suitable regardless of a shape, and wave number and wavelength of the progressive wave. A relation of 0.000003≦a-value/λ is suitable in order to achieve stable rotation. A relation of a-value/b-value≦3.0 is suitable. In addition, for the purpose of realizing stable rotation, a relation of 0.04≦a-value/b-value is suitable.

As described above, it is thought that controlling the vibrational wave motor in view of these relations leads to realization of advantages on many progressive wave type vibrational wave motors.

(Fourth Embodiment)

Next, the fourth embodiment of the present invention is described. In the fourth embodiment, the explanation is made using FIGS. 1-3 of the first embodiment.

In the fourth embodiment, consideration was given to the suitable range of the amount b of deformation. As a result, it was found that there is a proper amount b of deformation in the moving element 12, but this range of the amount b of deformation is different depending upon the kind of vibrational wave motor 10. However, as a result of repeated consideration, it has been found that there is a proper range without regard to the size or the like of the vibrational wave motor 10, in the value (b/λ) that is a obtained by dividing the amount b of deformation by the wavelength λ generated in the vibrational wave motor 10.

Hereinafter, an explanation is given for the experimental results in which the proper range of b/λ is obtained for a compact vibrational wave motor 10 and an annular vibrational wave motor 10.

It is noted that the preferable range in the compact vibrational wave motor 10 is 4 mm to 15 mm for λ. The sliding diameter (shown in FIG. 2) for which the moving element 12 slides is 5 mm to 40 mm. The height H of the sliding portion of the moving element 12 is 0.7 [mm]≦H≦1.2 [mm]. The loading p is 0.2 [N/mm] to 0.9 [N/mm].

[Experimental Result 1]

Table 3 shows the results obtained by researching abnormal noise characteristics and driving characteristics while varying the deformation amount b in a compact vibrational wave motor 10 having a sliding diameter D=10.6 mm, a wave number=4, and a wavelength of 8.33 mm.

TABLE 3

| SLIDING DIAMETER | | D (mm) | | 10.6 | | |
|---|---|---|---|---|---|---|
| WAVE NUMBER | | n | | 4 | | |
| WAVELENGTH | | λ (mm) | | 8.33 | | |
| | | No.1-a | No.1-b | No.1-c | No.1-d | No.1-e |
| P | N/mm | 0.255 | 0.300 | 0.255 | 0.210 | 0.300 |
| H | mm | 1.05 | 0.8 | 1.2 | 1.05 | 1.05 |
| b | mm | 0.00080 | 0.00257 | 0.00054 | 0.00066 | 0.00095 |
| b/λ | % | 0.009664 | 0.030849 | 0.006474 | 0.007959 | 0.011370 |
| ABNORMAL NOISE PROPERTY | | ○ | ○ | X | X | ○ |
| DRIVE PROPERTY | | ○ | X | ○ | ○ | ○ |

In the abnormal noise characteristics, O: no abnormal noise, X: notable abnormal noise.

In the driving characteristics, O: driving efficiency is good, X: extreme reduction of driving efficiency.

No. 1-a refers to the case of b/λ=0.009664. There is no occurrence of abnormal noise, and the driving property is also not problematic.

No. 1-b refers to the case where the height H of the sliding portion of the moving element 12 is reduced and the pressurizing force p is raised relative to the case of No. 1-a, and b/λ results in 0.030849. In this instance, the deformation amount b of the moving element 12 becomes large, and the contact state with the vibrating element 11 is tight, so that no abnormal noise is generated. Besides, when the amplitude is low (low velocity driving), influence is received from a reverse velocity part of the progressive wave and the driving efficiency is greatly reduced, which is manifested as an undesirable effect.

No. 1-c refers to the case where the height H of the sliding portion of the moving element 12 is large relative to the case of No. 1-a, and b/λ is 0.006474. In this instance, the deformation amount b of the vibrating element 11 is small, so that it is not possible to absorb the vibration force of the vibrating element 11 in the case that the amplitude of the vibrating element 11 is large, thereby generating abnormal noise.

No. 1-d refers to the case where a pressurization force p is small relative to the case of No. 1-a, and b/λ is 0.007959. As the pressurizing force p is small, holding by the pressurization is ineffective, and b appears to become small, generating abnormal noise.

No. 1-e refers to the case where the pressure p is greater relative to the case of No. 1-a, and b/λ is 0.011370. In this instance, abnormal noise and driving properties are also not problematic.

[Experimental Result 2]

Table 4 shows the study results of the abnormal noise property and driving property with respect to different values of b/λ in the case of using a circular ring type vibrational wave motor 10 having a sliding diameter D=57.3 mm, a wave number=9, and a wavelength of 20.00 mm.

TABLE 4

| SLIDING DIAMETER | | D (mm) | | 57.3 | |
|---|---|---|---|---|---|
| WAVE NUMBER | | n | | 9 | |
| WAVELENGTH | | λ (mm) | | 20.00 | |
| | No.2-a | No.2-b | No.2-c | No.2-d | No.2-e |
| P  N/mm | 0.060 | 0.060 | 0.060 | 0.039 | 0.060 |
| H  mm | 1.6 | 1.2 | 1.8 | 1.6 | 1.1 |
| b  mm | 0.00214 | 0.00506 | 0.00150 | 0.00138 | 0.00657 |
| b/λ  % | 0.010681 | 0.025319 | 0.007502 | 0.006923 | 0.032871 |

TABLE 4-continued

| ABNORMAL NOISE PROPERTY | ○ | ○ | x | x | ○ |
|---|---|---|---|---|---|
| DRIVE PROPERTY | ○ | Δ | ○ | ○ | x |

In the abnormal noise property, O: no abnormal noise, X: remarkable abnormal noise.

In the driving property, O: good driving efficiency, Δ: acceptable level of reduction in driving efficiency, X: extreme reduction in driving efficiency.

No. 2-a refers to the case of b/λ=0.010681. There is no abnormal noise, and the driving property is not problematic.

No. 2-b refers to the case where a height H of the sliding portion of the moving element 12 is reduced relative to the case of No. 1-a, and b/λ is 0.025319. In this instance, the deformation amount b of the moving element 12 becomes large and the contact state with the moving element 11 is tight, so that the abnormal noise is not generated. However, when the amplitude is low (low velocity driving), it is influenced by a reverse velocity part of the progressive wave, and a reduction of the driving efficiency starts to emerge as an undesirable effect.

No. 2-c refers to the case where the height H of the sliding portion of the moving element 12 is increased relative to the case of No. 2-a, and b/λ is 0.007502. In this instance, the deformation amount b of the vibrating element 11 is reduced, and it is not possible to absorb the vibrating force of the vibrating element 11 so that the abnormal noise is generated when the amplitude of the vibrating element 11 is large.

No. 2-d refers to the case where the pressurizing force p is reduced relative to the case of No. 2-a, and b/λ is 0.006923. If the pressurizing force p is small, holding by the pressurization is not effective, and b appears to be reduced, so that the abnormal noise is generated.

No. 2-e refers to the case where the height H of the sliding portion of the moving element 12 is further reduced relative to the case of No. 2-a, and b/λ is 0.032871. In this instance, the deformation amount b of the moving element 12 is further increased, and the contact state with the moving element 11 is tight, so that no abnormal noise is generated. Besides, when the amplitude is low (low velocity driving), it is influenced by a reverse velocity part of the progressive wave and the driving efficiency is extremely reduced, which is expressed as undesirable effects. As described above, a similar trend to the experimental results shown in the above Table 3 is also found in Table 4.

A summation of the above-described Experimental Results 1 and Experimental Results 2 is shown in Table 5.

TABLE 5

| | No.1-c | No.2-d | No.2-c | No. 1-d | No.1-a | No.2-a | No. 1-e | No.2-b | No.1-b | No.2-e |
|---|---|---|---|---|---|---|---|---|---|---|
| H | 1.2 | 1.6 | 1.8 | 1.05 | 1.05 | 1.6 | 1.05 | 1.4 | 0.9 | 1.6 |
| b/λ | 0.006474 | 0.006923 | 0.007502 | 0.007959 | 0.009664 | 0.010681 | 0.011370 | 0.025319 | 0.030849 | 0.032871 |
| ABNORMAL NOISE PROPERTY | x | x | x | x | ○ | ○ | ○ | ○ | ○ | ○ |
| DRIVE PROPERTY | ○ | ○ | ○ | ○ | ○ | ○ | ○ | Δ | x | x |

As shown in Table 5, the range of b/λ satisfactory for both abnormal noise occurrence and a driving property is 0.009≦b/λ≦0.03.

As described above, the drive surface 18a of the elastic body is subjected to a lubricant surface treatment. Its material is a substance which has polyamide-imide as a main component, to which PTFE is added, and having a Young's modulus of 4 GPa or higher and a thickness of 50 μm or less as physical properties.

If the Young's modulus of the lubricant material of the surface is smaller, or if the thickness is greater, it is possible that inroads deformation will occur at the location of the drive surface 18a in contact with the sliding surface 12a of the moving element 12, causing complicated frictional driving. For this reason, in 0.009%≦b/λ 0.03, it is thought that a Young's modulus of 4 GPa or higher and a thickness of 50 μm or less are preferable in order to surely realize good abnormal noise characteristics and driving characteristics.

It is noted that in a combination where the driving surface 18a of the vibrating element 11 is a metal material or metal plating and the sliding surface 12a of the moving element 12 is a metal material or metal plating, as the deformation amount b of the moving element 12 is increased, frictional wear becomes intense when the driving velocity is high, because of frictional driving between the metal materials. For this reason, the b-value, usually cannot be set larger relative to $\lambda$. In such a case, b/$\lambda$ is also small, and it may be unnecessary to consider problems in the driving characteristics occurring when increasing b.

However, in recent years, it has become possible to reduce frictional wear when increasing the vibration amplitude to increase the driving velocity, by forming a thin lubricant film with a high Young's modulus on the drive surface 18a or the sliding surface 12a. In this case, the value of b can be increased.

In such a case where the frictional wear is small, the effects of the present embodiment appear more remarkably.

However, even in a combination where the drive surface 18a of the vibrating element 11 is a metal material or metal plating, and the sliding surface 12a of the moving element 12 is a metal material or metal plating according to the prior art, when frictional wear at the time of high-velocity driving does not occur, the effects of the present embodiment are sufficiently apparent.

As described above, according to the present embodiment, a range of 0.009%$\leq$b/$\lambda\leq$0.03% is suitable even if the wave number and wavelength of the progressive wave are different, and by setting the material properties and the shape or the pressurization condition of the moving element 12 to this range, it is possible to realize a progressive wave type vibrational wave motor 10 that is silent and excellent in driving characteristics regardless of the wave number and wavelength of the progressive wave.

It should be noted that the above-described embodiment is disclosed concerning the case of a vibrational wave motor using a progressive vibrational wave and the wave number being 4 or 9, however, similar effects can be expected if control is executed with a similar method for a similar constitution, even for other wave numbers of 5, 6, 7, 8, 10 or more.

What is claimed is:

1. A vibrational wave motor comprising:
   an electromechanical conversion element excited by a driving signal;
   a vibrating element joined with the electromechanical conversion element, and having a drive surface where a progressive vibrational wave is generated by the excitation;
   a relative motion member having a sliding surface pressure-contacting the drive surface of the vibrating element, and which is driven by the progressive vibrational wave; and
   a driving device for providing the driving signal to the electromechanical conversion element, wherein:
   the driving device provides the driving signal to the electromechanical conversion element, the driving signal generating the progressive vibrational wave satisfying a-value/$\lambda\leq$0.00025 in the drive surface, where a vibration amplitude generated in the drive surface of the vibrating element is defined as the a-value, and a wavelength of the progressive wave generated in the drive surface of the vibrating element is defined as $\lambda$.

2. A vibrational wave motor according to in claim 1, wherein:
   the driving device provides to the electromechanical conversion element the driving signal for generating the progressive vibrational wave satisfying a-value/b-value$\leq$3 at the drive surface, where the vibration amplitude caused at the drive surface of the vibrating element is defined as the a-value, a deformation amount of the sliding surface of the relative motion member pressurized and brought into contact with the drive surface of the vibrating element in a pressurization direction is defined as the b-value.

3. A vibrational wave motor according to claim 1, wherein:
   the driving device provides to the electromechanical conversion element the driving signal for generating the progressive vibrational wave satisfying 0.000003$\leq$a-value/$\lambda$ in the drive surface.

4. A vibrational wave motor according to claim 1, wherein:
   the driving device provides to the electromechanical conversion element the driving signal for generating the progressive vibrational wave satisfying 0.04$\leq$a-value/b-value in the drive surface.

5. A vibrational wave motor according to claim 1, wherein:
   a durable thin film is applied to the drive surface of the elastic body or the sliding surface of the relative motion member.

6. A vibrational wave motor according to claim 5, wherein:
   the thin film has polyamide-imide as a main component, and has a Young's modulus of 4 GPa or higher and 10 Gp or less, and a film thickness of 50 μm or less.

7. A lens barrel provided with a vibrational wave motor according to claim 1.

8. A camera provided with a vibrational wave motor according to claim 1.

9. A vibrational wave motor comprising:
   an electromechanical conversion element excited by a driving signal;
   a vibrating element joined with the electromechanical conversion element, and having a drive surface where a progressive vibrational wave is generated by the excitation;
   a relative motion member having a sliding surface pressure-contacting the drive surface of the vibrating element, and which is driven by the progressive vibrational wave; and
   a driving device for providing the driving signal to the electromechanical conversion element, wherein:
   the driving device provides the driving signal to the electromechanical conversion element, the driving signal generating the progressive vibrational wave satisfying a-value/b-value$\leq$3 in the drive surface, where a vibration amplitude generated in the drive surface of the vibrating element is defined as the a-value, and the deformation amount in a pressurization direction of the sliding surface of the relative motion member pressure-contacting the drive surface of the vibrating element is defined as the b-value.

10. A vibrational wave motor comprising:
    a vibrating element generating a progressive vibrational wave in a drive surface by excitation of an electromechanical conversion element;
    a relative motion member having a sliding surface pressure-contacting the drive surface of the vibrating element, and being driven by the progressive vibrational wave, wherein:
    0.009$\leq$b/$\lambda\leq$0.03 [%] is held when a deformation amount in a pressurization direction of the sliding surface of the relative motion member which pressure-contacts the drive surface of the vibrating element is defined as b, and a wavelength of the progressive wave generated at the drive surface of the vibrating element is defined as $\lambda$.

11. A vibrational wave motor according to claim 10, wherein:
   a durable thin film is applied on the drive surface of the vibrating element or the sliding surface of the relative motion member.

12. A vibrational wave motor according to claim 11, wherein:
   the durable thin film has polyamide-imide as a main component, and a Young's modulus of 4 GPa or higher and a film thickness of 50 μm or less.

13. A vibrational wave motor according to claim 10, wherein:
   the wavelength is 4 to 15 mm.

14. A vibrational wave motor according to claim 10, wherein:
   a sliding central diameter is 5 mm to 40 mm.

15. A vibrational wave motor according to claim 10, wherein:
   a height H of the sliding portion of the relative motion member is $0.7\ [\text{mm}] \leqq H \leqq 1.2\ [\text{mm}]$.

16. A vibrational wave motor according to claim 10, wherein:
   if N is a pressurization force with which the vibrating element and the relative motion member are pressure-contacted and D is a sliding diameter of the relative motion member, then $N/D=p$ has a range of $0.2\ [\text{N/mm}] \leqq p \leqq 0.9\ [\text{N/mm}]$.

17. A lens barrel provided with the vibrational wave motor according to claim 10.

18. A camera provided with the vibrational wave motor according to claim 10.

* * * * *